(12) United States Patent
Petersson et al.

(10) Patent No.: US 7,873,346 B2
(45) Date of Patent: Jan. 18, 2011

(54) ARRANGEMENT AND METHOD FOR DETERMINING CHARGING IN A TELECOMMUNICATIONS SYSTEM

(76) Inventors: Justus Petersson, Sankt Paulsgatan 28B, S-118 48 Stockholm (SE); Robert Skog, Gullvivegränd 7, S-165 76 Hällselby (SE)

( * ) Notice: Subject to any disclaimer, the term of this patent is extended or adjusted under 35 U.S.C. 154(b) by 924 days.

(21) Appl. No.: 10/595,877

(22) PCT Filed: Nov. 19, 2003

(86) PCT No.: PCT/SE03/01790
§ 371 (c)(1),
(2), (4) Date: May 17, 2006

(87) PCT Pub. No.: WO2005/050913
PCT Pub. Date: Jun. 2, 2005

(65) Prior Publication Data
US 2007/0130389 A1    Jun. 7, 2007

(51) Int. Cl.
*H04M 11/00*   (2006.01)
*G06F 3/00*    (2006.01)
(52) U.S. Cl. .................. 455/406; 710/52; 370/468
(58) Field of Classification Search ............... 455/406; 710/52
See application file for complete search history.

(56) References Cited
U.S. PATENT DOCUMENTS 5,828,737 A * 10/1998 Sawyer ............... 379/114.07
6,006,085 A * 12/1999 Balachandran .............. 455/406
6,061,556 A    5/2000 Rahman
6,154,643 A   11/2000 Cox
2002/0131496 A1* 9/2002 Vasudevan et al. ..... 375/240.11
2003/0186678 A1  10/2003 Lucidarme et al.
2003/0229595 A1* 12/2003 Mononen et al. .............. 705/63
2005/0086062 A1* 4/2005 Clark et al. .................... 705/1

FOREIGN PATENT DOCUMENTS
WO     WO 9716034 A2    5/1997

* cited by examiner

*Primary Examiner* — Ajit Patel
*Assistant Examiner* — Timothy Pham

(57) ABSTRACT

The present invention relates to a method and arrangements for determining charging related to a data bit transfer session from a traffic source (209) to a client (213), said bit transfer session involving bit transfer over a wireless communications link (214*f*) under the control of a radio resource managing unit (204). According to the method of the present invention the radio resource managing unit (204) sends information regarding the bandwidth on the wireless link that the bit transfer session currently is allowed to use to a charging logic (212). This bandwidth information from the radio resource managing unit (204) is used by the charging logic (212) to determine the charging related to the bit transfer session. Thereby a fair charging of the session may be achieved, which is adapted to the quality of service actually obtained by the end-user for the session.

21 Claims, 9 Drawing Sheets

ARRANGEMENT AND METHOD FOR DETERMINING CHARGING IN A TELECOMMUNICATIONS SYSTEM

FIELD OF THE INVENTION

The present invention relates to communications systems and methods, and more particularly, to determining charging related to a data bit transfer session involving transfer over a wireless link in a telecommunications system.

BACKGROUND OF THE INVENTION

The charging system of a telecommunications system is by many considered to be one of the most important parts of the telecommunications system. Certainly the operator is interested in a charging system that actually charges clients for used services. A client of an operator is especially interested in that the charging is fair so that he or she is not being charged for any services that he or she has not used or received. Fair charging is also important to the operator from a business perspective. An operator that is known for unfair charging will have trouble selling its services, while an operator who is able to offer a more flexible charging that is adjusted to the type and quality of service that a client actually receives is given a competitive edge.

The basis of charging differs between different types of services. For some types of services the charging is based on volume, e.g. amount of delivered data bits and for other services on time, e.g. the duration of a communications session. There are also services that are charged per usage of the services, so-called service based charging. With service based charging volume charging may be turned off, e.g. for charging of MMS (Multimedia Messaging Service), where the operator may choose to charge per sent and delivered message instead of basing the charging on the number of sent and delivered data bits. Different types of charging may also be combined and applied differently depending on the user of the service.

Charging aspects in 3G systems are discussed in 3GPP TS 32.200 V5.5.0 (2003-09), 3GPP TS 32.015 V3.11.0 (2003-03) and 3GPP TS 12.15 V7.7.0 (2002-12).

The transfer of data over wireless links may give rise to charging problems not encountered when transferring data over fixed wired connections. The bandwidth that is available for a radio connection in a mobile communication network may vary very fast due to changes in the characteristics of the air-interface caused by e.g. shadowing, or due to redistribution of the assigned bandwidth to the users in a cell. In conventional systems this may lead to situations where an end-user pays for something he/she never got or to situations where the end-user pays an unreasonably high amount in relation to the delivered quality of service.

Consider for instance a packet switched PDP (Packet Data Protocol) context that is activated between a mobile phone and an application server. The activation of the PDP context will cause different nodes e.g., SGSN (Serving GPRS Support Node), GGSN (Gateway GPRS Support Node) and the application server, to generate Charging Data Records (CDRs). CDRs in SGSN and GGSN are based on volume, i.e. the amount of IP-packets that has been transported in the network. When the PDP context is up, the network transports IP-packets from the application server to the mobile phone. When these IP-packets are transported it could happen that the end-user temporarily is "out-of-connection" with the application server e.g., when the user moves indoor where the coverage is poor or when a cell re-selection occurs. Cell re-selection occurs e.g. when the end-user is moving from a WCDMA system to a GSM system (or vice versa). During cell re-selection there is a long IP-session interrupt.

If an interruption happens this might for some types of sessions trigger the end-user to terminate the session. However since there is no connection between the end-user and the application server for the time being, the application server is unaware that the end-user has terminated the session.

Thus the application server will continue to produce CDRs which leads to a situation where the end-user pays for something he/she never got.

Bandwidth changes and interrupts may also lead to a longer session and perceived bad service so that the client finds it unacceptable to pay the same amount for the session as he/she would for a session without as many bandwidth changes and interrupts.

Even if there is no complete interruption the available bandwidth on the wireless communications link to the mobile phone may decrease to such an extent that some IP-packets have to be discarded by the RNC (Radio Network Controller) and thus not delivered to the end-user. However other nodes may already have generated CDRs for the packets that later are discarded by the RNC so that the end-user ends up paying for packets that were never delivered to him/her.

From the above-described example it is clear that problems with unfair charging may arise during data bit transfer sessions involving wireless links in conventional telecommunications systems.

SUMMARY OF THE INVENTION

An object of the present invention is to provide improved methods and arrangements for overcoming the above mentioned problems with unfair charging in relation to data bit transfer sessions involving wireless links.

As mentioned above the bandwidth on a wireless link can vary considerably over time. The invention is based on the realization that it may therefore be appropriate to adapt charging related to data bit transfer session that involves transfer of data bits over the wireless link to the available bandwidth on the wireless link. The bandwidth that the session is allowed to use on the wireless link is dynamically determined by a radio resource managing unit, which continuously as the radio conditions changes revises its previously made bandwidth decisions for ongoing sessions. According to the present invention the radio resource managing unit informs a charging logic, which controls the charging related to the session, about the bandwidth that is allowed for the session on the air interface involved in the session. According to the present invention this bandwidth information assists in determining appropriate charging for the session which allows for a more flexible and fair charging.

According to a first aspect of the present invention a method is provided for determining charging related to a data bit transfer session. The bit transfer session involves bit transfer over a wireless communications link under the control of a radio resource managing unit. The radio resource managing unit dynamically determines the bandwidth on the wireless link that the bit transfer session is allowed to use. According to the method a charging logic receives information from the radio resource managing unit about the bandwidth on the wireless link that the bit transfer session is allowed to use and the charging logic determines the charging related to the bit transfer session based on the received information from the radio resource managing unit.

According to a second aspect of the present invention a charging logic is provided for determining charging related to a data bit transfer session. The bit transfer session bit transfer session involves bit transfer over a wireless communications link under the control of a radio resource managing unit. The radio resource managing unit dynamically determines the bandwidth on the wireless link that the bit transfer session is allowed to use. The charging logic according to the second aspect of the invention includes reception means for receiving information from the radio resource managing unit about the bandwidth on the wireless link that the bit transfer session is allowed to use and charging determining means for determining the charging related to the bit transfer session based on the received information from the radio resource managing unit.

An advantage of the present invention is that it allows for a fairer charging of data bit transfer sessions involving data bit transfer over a wireless link compared to prior art solutions. By means of the present invention situations in which a client is billed for data bits that he/she never received can be avoided. Also situations in which the client is billed an unreasonably high amount in view of the quality of service he/she received can be avoided. This is obviously beneficial to the client, but also to the operator with regard to maintaining good customer relations.

Another advantage of the present invention is that the invention allows for a more flexible charging. The information from the radio resource managing unit makes it possible for the charging logic to adapt the charging to the available bandwidth on the wireless link. The charging logic may e.g. employ different charging classes where the charging differs depending on the bandwidth that is available for the session on the wireless link. The charging rate may for instance be higher when the available bandwidth is large and lower when the available bandwidth is low. Flexible charging may be an attractive feature to many clients and the ability to offer such flexible charging can thus give an operator a competitive advantage compared to other operators who are not able to do the same.

Yet another advantage of the present invention is that it provides a simple solution for avoiding some situations of unfair charging. According to the invention situations of unfair charging can be avoided without the need to track individual data packets.

A further advantage of the present invention is that the charging of a session can be adapted to the radio conditions experienced by the session without the involvement of the application. Since the charging logic, according to the present invention, receives the information regarding the radio conditions and adjusts the charging accordingly, the application can be unaware of radio conditions or its impact on the charging of the session. Existing applications can thus remain unchanged and continue to produce charging records to the charging logic in the same way as in prior art solutions. The adaptations for adjusting the charging to the radio conditions are made in the charging logic.

Yet a further advantage of the present invention is that it is particularly suitable for achieving fair charging schemes for real-time critical services like streaming and broadcast services, for which the perceived quality of service primarily depends on the bandwidth and not on the number of received data packets.

An advantage according to an embodiment of the present invention is that different messages from the radio resource managing unit regarding the available bandwidth of a session can be synchronized in the system. If for instance the radio resource managing unit continuously send bandwidth information messages to an application server for rate control purposes the application server may be arranged to relay received bandwidth information to the charging logic. Thereby the radio resource managing unit is not required to send a dedicated message to the charging logic for the purpose of achieving fair charging, which allows for message economy over critical connections within the system. Keeping the number of messages to a minimum over critical connections within the system is desirable in order to avoid overloading bottlenecks with unnecessary messages.

Further advantages and objects of embodiments of the present invention will become apparent when reading the following detailed description in conjunction with the drawings.

DETAILED DESCRIPTION

Figure 1:
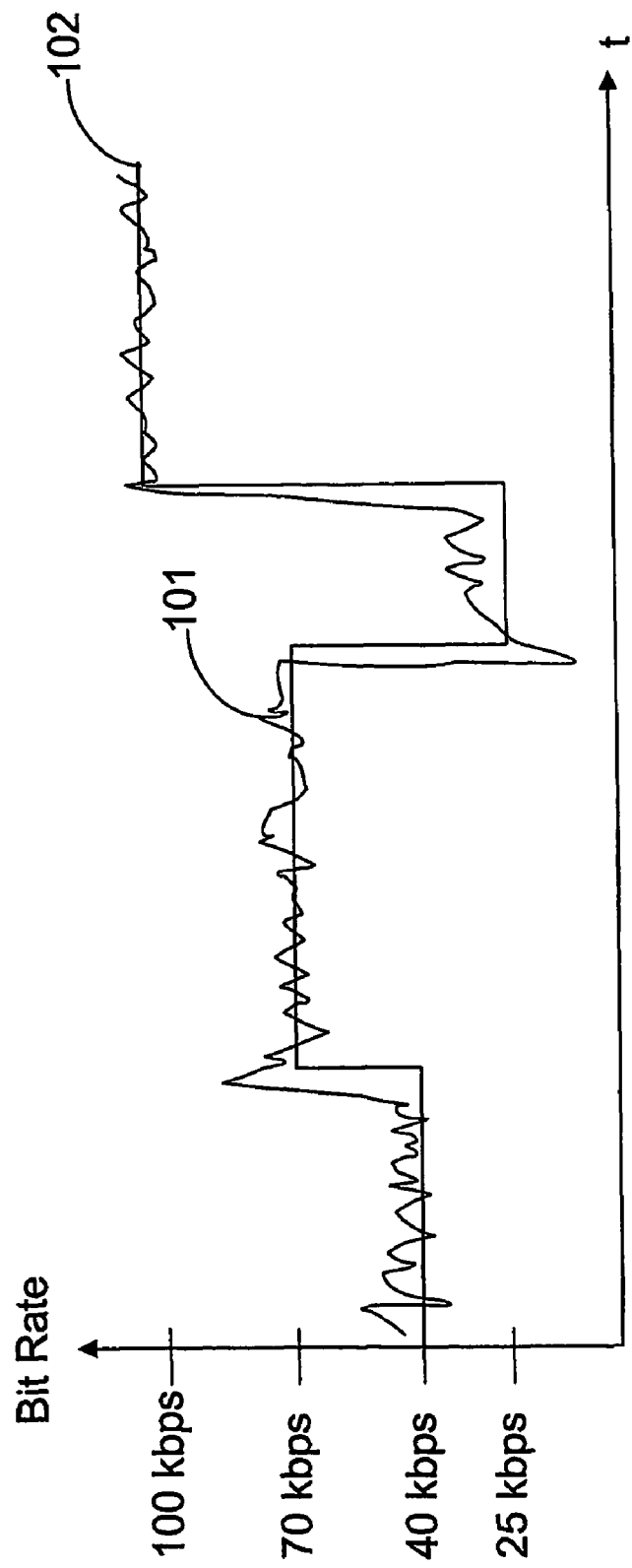
FIG. 1 is a diagram that illustrates how the bandwidth over an air-interface may vary over time for a specific session.

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. In the drawings, like numbers refer to like elements.

The present invention is applicable to person-to-content (P2C) and person-to-person (P2P) packet switched services in a mobile system. P2C services comprise packet switched communication between a user equipment of an end-user and an application server. P2P services comprise packet switched communication between two different user equipments of end-users. The present invention is also applicable to services involving more than two end-users and user equipments. The mobile system includes a mobile network such as a WCDMA, CDMA2000, Wireless LAN or GPRS network in which the user equipment resides.

When a communication session is set up between the mobile user equipment and the application server, or between the mobile user equipment of a first user and the user equipment of a second user, the available bandwidth over the air interface will normally be the limiting factor on the bit rate of the session. The characteristics of the air-interface, e.g. shadowing, may have negative consequences for the end-user. Also mobility of an end-user and the load on the air-interface can affect the bandwidth over the air-interface that is assigned to a session. The invention recognizes that it might therefore be of interest to adapt the charging for a session depending on the bandwidth over the air-interface that is assigned to a session.

FIG. 1 is a diagram that illustrates how the bandwidth over an air-interface may vary over time for a specific session. A first curve 101 illustrates the actual physical bandwidth which may change very fast due to e.g. fast fading. A second curve 102 illustrates the bandwidth for the specific session, which is decided by a radio resource managing unit by means of e.g. a Channel Rate Switching RRM (Radio Resource Management) algorithm based on i.a. the actual physical bandwidth (curve 101). The bandwidth that is decided by the radio resource managing unit is the available bandwidth over the air-interface that the session is allowed to use. According to the present invention the long-term bandwidth changes, which are decided by the radio resource managing unit, for the session (curve 102) are used for determining the charging for the session. Due to the fast changes of the actual physical bandwidth it is not practical to use curve 101 as a basis for charging. Thus according to the present invention the charging will only be based on the more slowly changing bandwidth decisions of the radio resource managing unit, i.e. curve 102.

According to the present invention a charging logic of a charging system is informed of the bandwidth decisions of the radio resource managing unit as will be explained in greater detail below. The charging logic may according to an embodiment of the invention specify different charging classes for different bandwidth rates and apply different charging rates to different classes. The charging logic may for instance specify that if the bandwidth of a session is $\geq 100$ kbps then the charging rates of a charging class A should be applied for the session, if the bandwidth is $\geq 70$ kbps but $<100$ kbps the charging rates of a charging class B should be applied, if the bandwidth is $\geq 40$ kbps but $<70$ kbps the charging rates of a charging class C should be applied, and if the bandwidth is $<40$ kbps the charging rates of a charging class D should be applied. Thus based on the received bandwidth information from the radio resource managing unit, the charging logic can map the session onto one of the charging classes A, B, C, or D. The session may change charging class during the term of the session due to changes in the bandwidth for the session over the wireless link, i.e. over the air-interface. The charging logic can also determine that the charging of the session should be zero when the bandwidth for the session over the wireless link is below a certain threshold is level.

The ability to adapt the charging of a session to the bandwidth of the session over a wireless link is particularly interesting for certain types of services. There are services for which the bandwidth and the bandwidth fluctuations of the session have a particularly large impact on the end-user's perceived quality of service. It may for instance be very disturbing to the end-user of a real-time critical streaming session if the bandwidth of the session falls below a certain limit and it may be even more disturbing if the bandwidth of the session fluctuates heavily. By means of the present invention the operator may implement the charging logic to adapt the charging of a session to the bandwidth of the session over a wireless link and thereby also to the end-user's perceived quality of service. Since the impact of the bandwidth on the end-user's perceived quality of service differs depending on the type of service of the session the charging scheme to be applied can depend on the type of service. The bandwidth information received by the charging logic from the radio resource managing unit may thus have a greater impact on the charging of some sessions than it may have on other sessions that relate to other types of services. Accordingly the operator can apply charging schemes that are considered to be more attractive by the operator's customers since the charging can depend on the quality of service that the end-user perceives.

Figure 2:
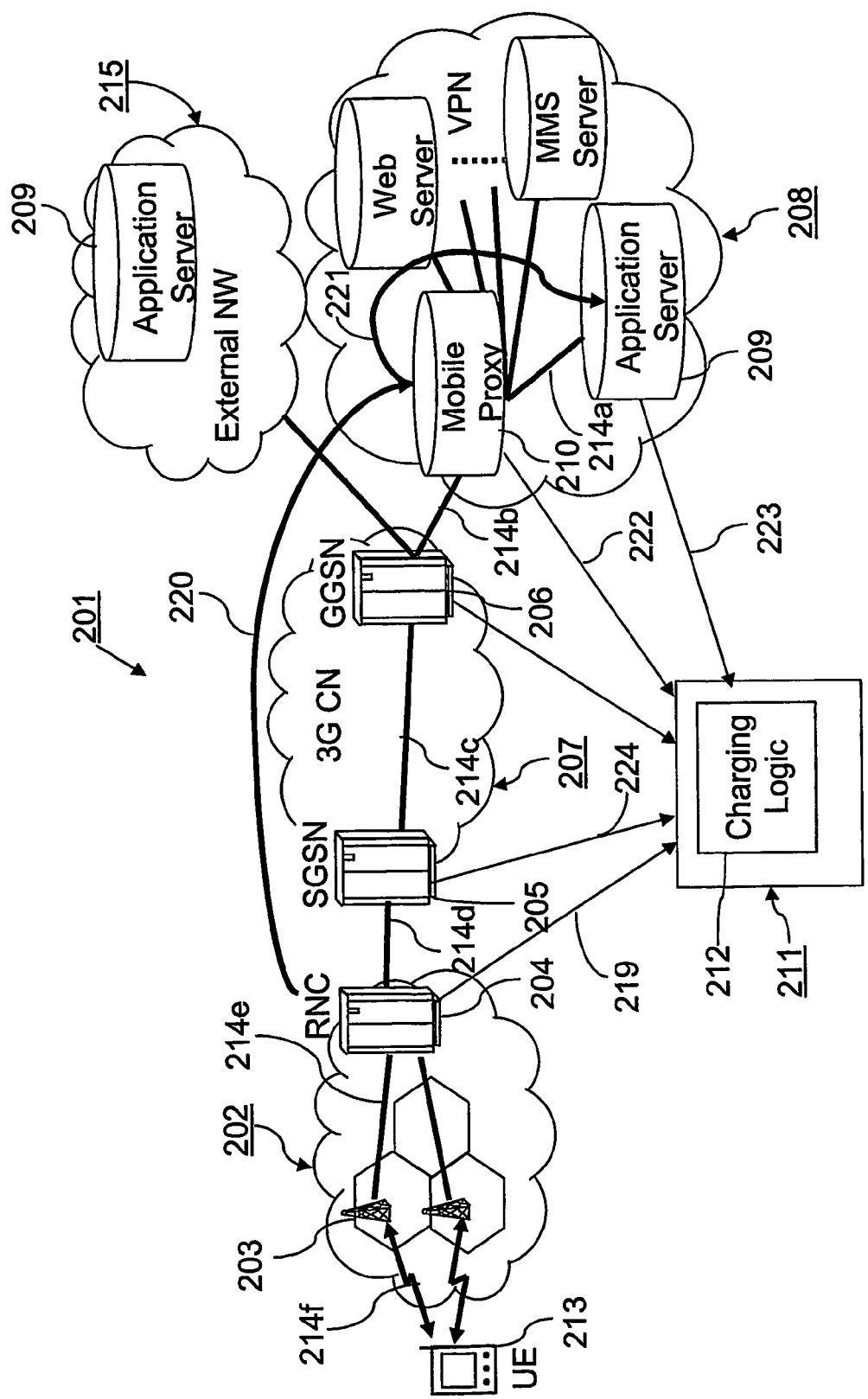
FIG. 2 is a schematic block diagram that illustrates an embodiment of the present invention in a UMTS system 201 in the case of packet switched P2C services.

FIG. 2 is a schematic block diagram that illustrates an embodiment of the present invention in a UMTS system 201 in the case of P2C services. The system includes a radio access network 202 comprising a number of Radio Base Stations (RBSs) 203 and at least one Radio Network Controller (RNC) 204. The system further includes a Serving GPRS Support Node (SGSN) 205 and a Gateway GPRS Support Node (GGSN) 206, which are nodes in a Core Network (CN) 207 that provides a connection between the radio access network 202 and a Service Network (SN) 208. The Service Network 208 includes an Application Server 209 and a Mobile Proxy 210. The characteristics and function of the mentioned units in the UMTS system are well known to a person skilled in the art and will therefore not be explained in further detail herein.

The UMTS system 201 further includes a charging system 211 comprising a charging logic 212. The charging system collects charging information from different units in the UMTS system such as the SGSN 205, the GGSN 206 and the Application Server 209. The charging information relates to different sessions in the UMTS system and the charging system is arranged to post process the received charging information to determine the charging to be applied to the different sessions in the UMTS system.

In FIG. 2 the charging system 211 is schematically illustrated as a separate system that comprises the charging logic 212. However the charging system may be physically distributed and the charging logic may be integrated with other units in the UMTS system as will be explained further below. However FIG. 2 gives a logic illustration of the charging system 211 and the charging logic.

In FIG. 2, a P2C bit transfer session may be set up between the Application Server 209 in the Service Network 208 and a client on a User Equipment (UE) 213 by means of connections 214a-f via the Mobile Proxy 210, the GGSN 206, the CN 207, the SGSN 205 and the radio access network 202. Alternatively the session may be set up between the UE 1 and an Application Server 209 in an external network 215 with which the Mobile Proxy 210 communicates. The connections 214a-f may for instance be TCP connections, UDP connections or connections based on another type of transport protocol.

The RNC 204, is in FIG. 2 the radio resource managing unit that determines the bandwidth that the session is allowed to use over the air-interface to the UE 213, i.e. the allowed bandwidth for the connection 214f. According to the present invention the RNC is arranged to forward information on the bandwidth it has determined for the connection 214f to the charging system 211 as charging information. The charging logic 212 of the present invention is arranged to receive the charging information from the RNC and base the charging of the session on the received information from the RNC. Thus according to the present invention, the charging logic may adapt the charging of the session to the bandwidth for the session on the connection 214f, which allows for a fairer charging of the session.

The RNC 204 may be arranged to forward the above mentioned bandwidth information directly to the charging system 211, as indicated by arrow 219, or via other units in the UMTS system 201 to the charging system 211. In FIG. 2 arrows 220 and 221 illustrates that the RNC 204 may send signals with the bandwidth information to the Mobile Proxy 210 and/or the Application Server 209. As illustrated with arrows 222 and 223, this bandwidth information from the RNC is then relayed from the Mobile Proxy 210 and/or Application Server 209 to the charging system, possibly along with other charging information from the Mobile Proxy and/or Application Server. The charging system then post processes the charging information received from the Mobile Proxy 210 and the Application Server 209 and other charging information received from other nodes such as e.g. SGSN and GGSN. The RNC may also be arranged to send the bandwidth information to the GGSN (not shown in FIG. 2), which can be arranged to relay this information to the charging system.

Figure 3:
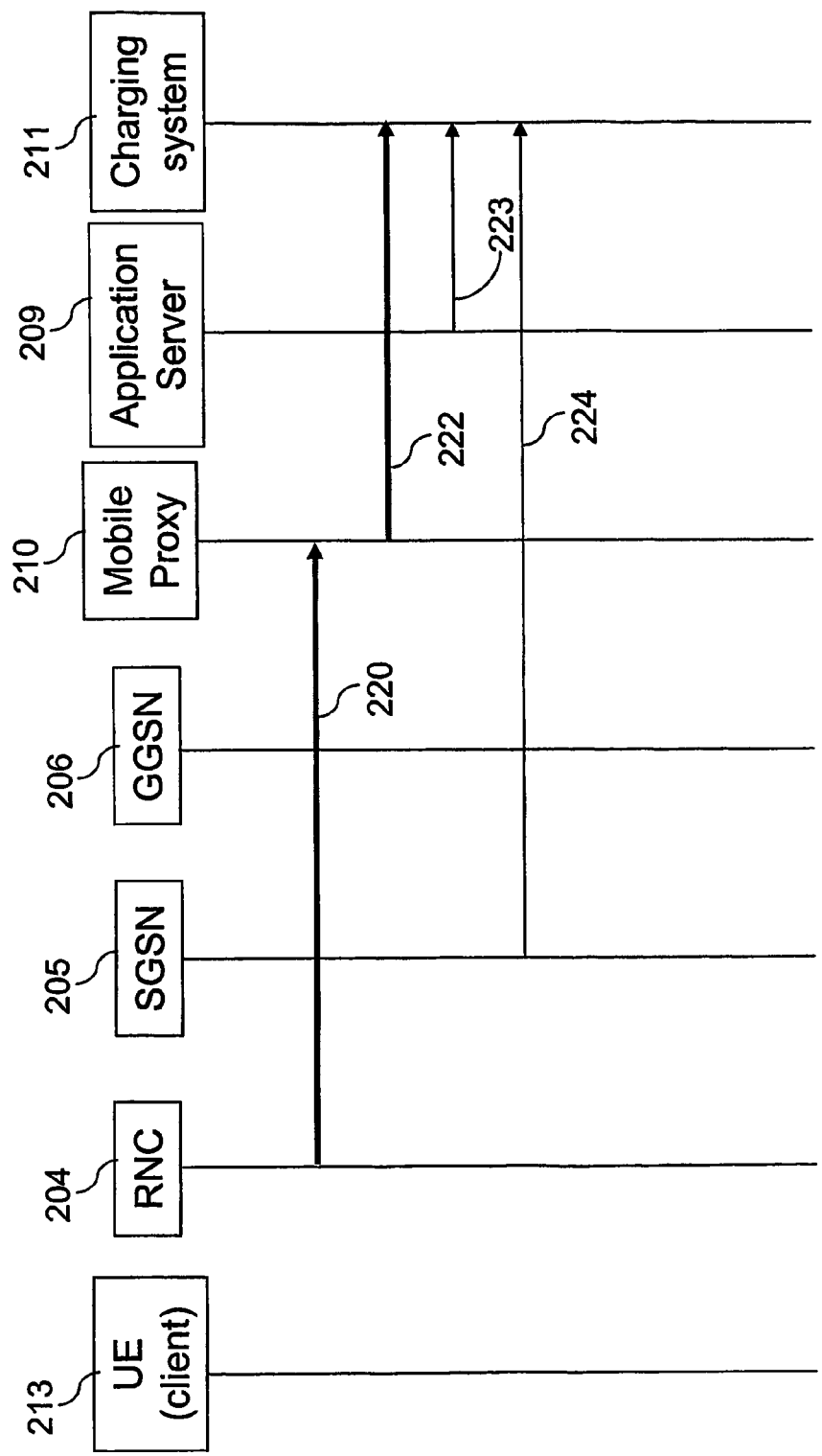
FIG. 3 is a flow diagram that illustrates the new signalling that is introduced according to an embodiment of the present invention.

FIG. 3 is a flow diagram that illustrates the new signalling that is introduced according to an embodiment of the present invention. According to the embodiment illustrated in FIG. 3 the RNC sends a signal 220, which contains bandwidth information for charging post processing, to the Mobile Proxy. The mobile proxy then sends a signal 222, which includes the bandwidth information received from the RNC, to the charging system. The charging system may also obtain signals 223 and 224 with other types of prior art charging information for post processing from other units such as SGSN and the Application Server. The prior art charging information may for instance be information from the SGSN on the time and/or volume of a session or information from the Application server on usage of a particular service. The reception and consideration by the charging system of such other types of prior art charging information are well known to the person skilled in the art. The reception by the charging system of signals, such as the signal 222, which include bandwidth information relating to the allowed bandwidth that a radio resource managing unit has determined for a session is however not used in conventional systems or known according to the prior art.

As mentioned above the signals 220 and 222 includes bandwidth information from the RNC. Apart from the bandwidth information these signals also need to include information that informs the charging system of the session with which the bandwidth information is associated. The charging system must also be informed of the end-user who is to be charged for the session. For this purpose the signals 220 and 222 may also include a session identity and an end-user identity. The session identity may for instance be an IP-address that is assigned to the UE 213 for the session and the end-user identity may for instance be an MSISDN or IMSI number. There are known methods for the RNC to obtain session identity and end-user identity information to be included in the signal 220. If the message with the bandwidth information from the RNC to the charging system is relayed via another node, such as GGSN, the GGSN may be arranged to complete the bandwidth information message with the end-user identity information if the RNC did not include this information in the message.

Figure 4:
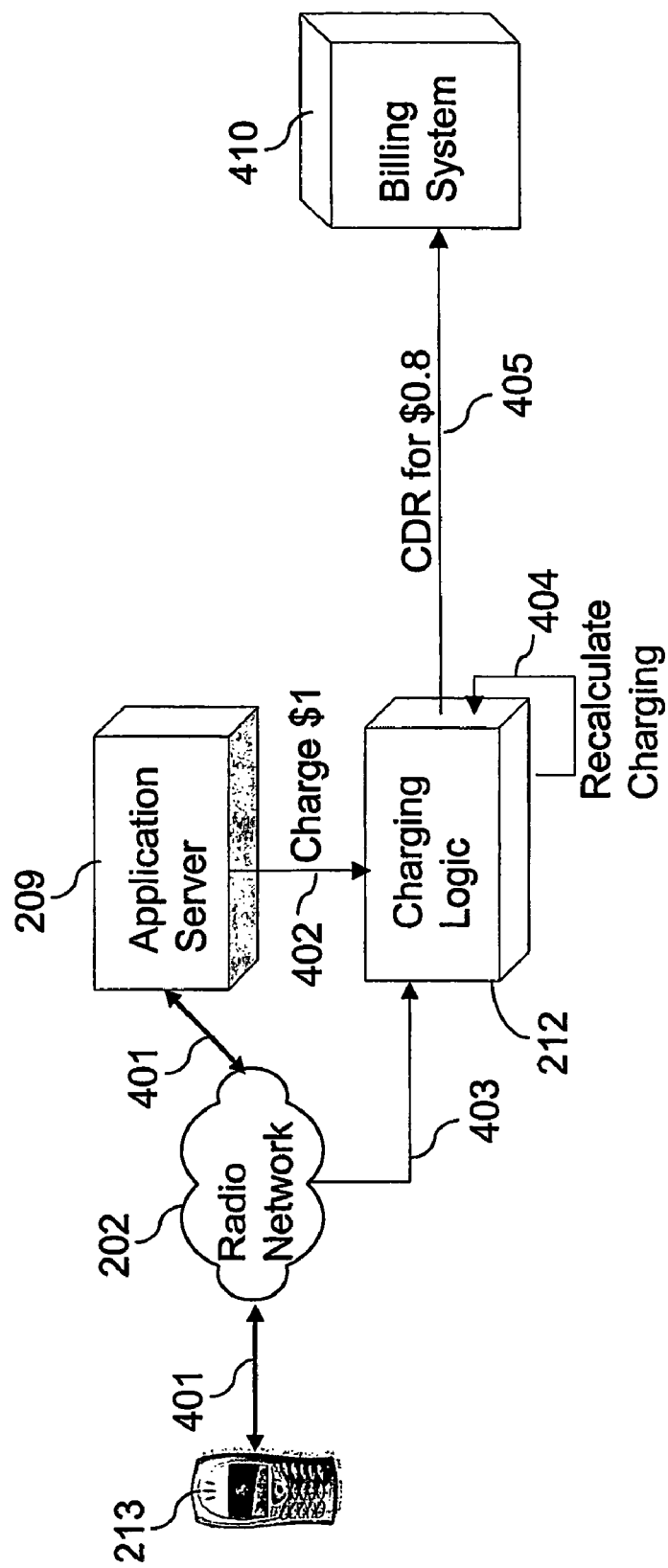
FIG. 4 is a schematic block diagram that illustrates the principle of the method according to the present invention by means of a simple exemplary scenario.

FIG. 4 is a schematic block diagram that illustrates the principle of the method according to the present invention by means of a simple exemplary scenario. Note that FIG. 4 shows a much simplified view of a radio and core network architecture. Arrows 401 indicates that an end-user is using an application, which gives rise to application traffic between the User Equipment 213 and an application logic of an Application Server 209 via the Radio Access Network 202. In this exemplary scenario we assume that the application in an MMS service. Arrow 402 indicates that the application logic will send charging information to the charging logic 212 that tells the charging logic to charge $1 for usage of the MMS service. However according to the present invention the charging logic 212 will in addition to the charging information from the application logic also receive radio network feedback in the form of bandwidth information from a radio resource managing unit of the Radio Access Network 202 as indicated by arrow 403. The radio network feedback provides the charging logic with information that relates to the quality of the service experienced by the end-user. In this exemplary scenario the charging logic uses the received radio network feedback to deduct a new cost for the usage of the service as indicated by arrow 404 and to create a Charging Data Record (CDR) for $0.8 instead of $1. The CDR is then sent to a billing system 410 (arrow 405), which bills the end-user $0.8 for usage of the MMS service.

In the simple scenario illustrated in FIG. 4 the charging logic decided to charge the end-user a lower amount for usage of the service than what would have been the case if the charging logic had not taken the radio network feedback into account. In this case one might assume that this was because the radio network feedback indicated that the bandwidth on the radio interface to the UE 213 was not adequate to offer the end-user the quality of service required in order to charge the end-user in full for the service. Therefore the charging logic decided to give the end-user a 20% discount for the usage of the service. What charging rate to apply and in what way the charging logic is arranged to take the radio network feedback into account is a matter for the operator or service provider to decide. The scenario shown in FIG. 4 will however illustrate the basic principle of how an operator or service provider may offer an end-user fairer charging by means of the present invention.

Figure 5:
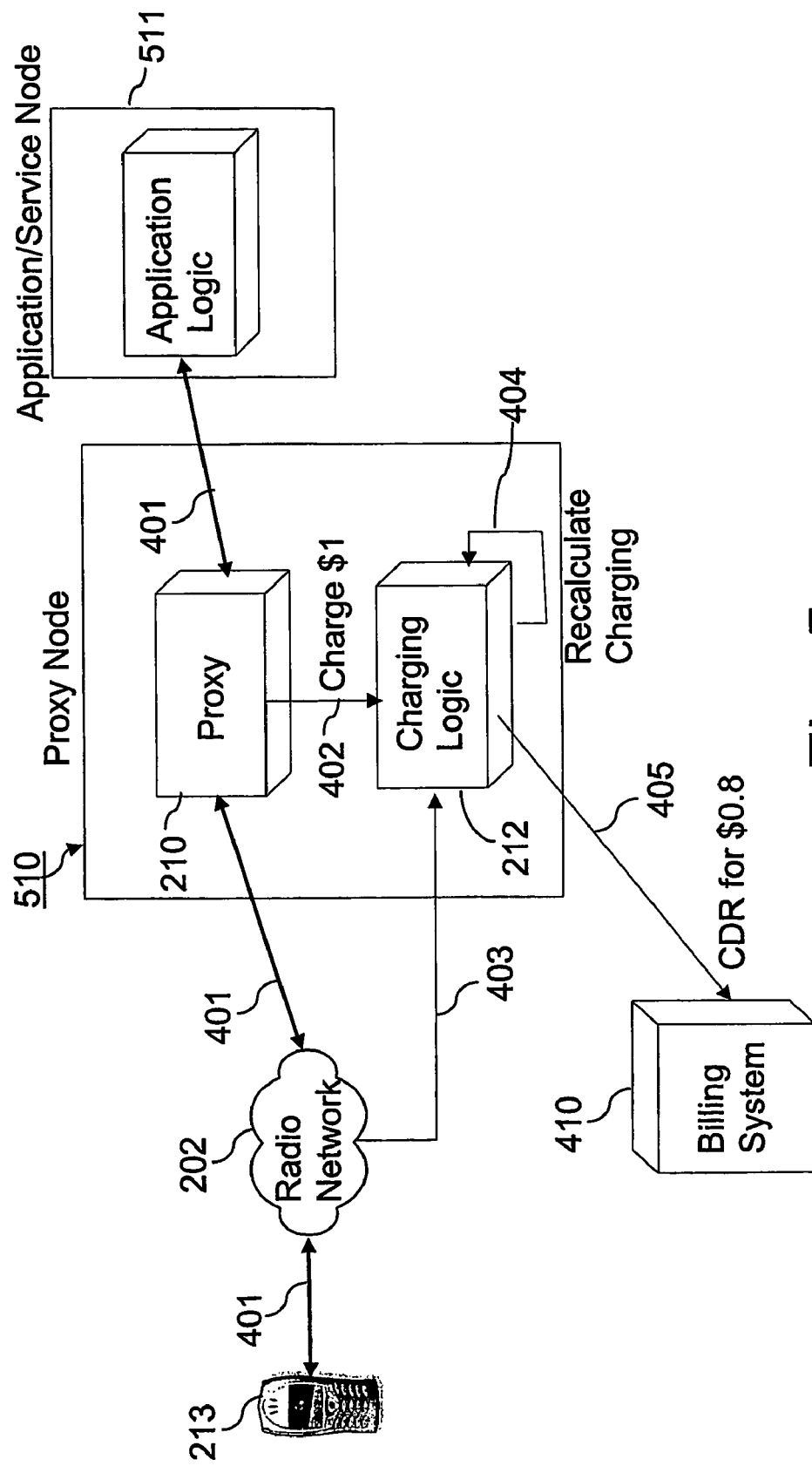
FIGS. 5, 6 and 7 are schematic block diagrams that illustrates that the present invention may be implemented with different locations of the charging logic.
Figure 6:
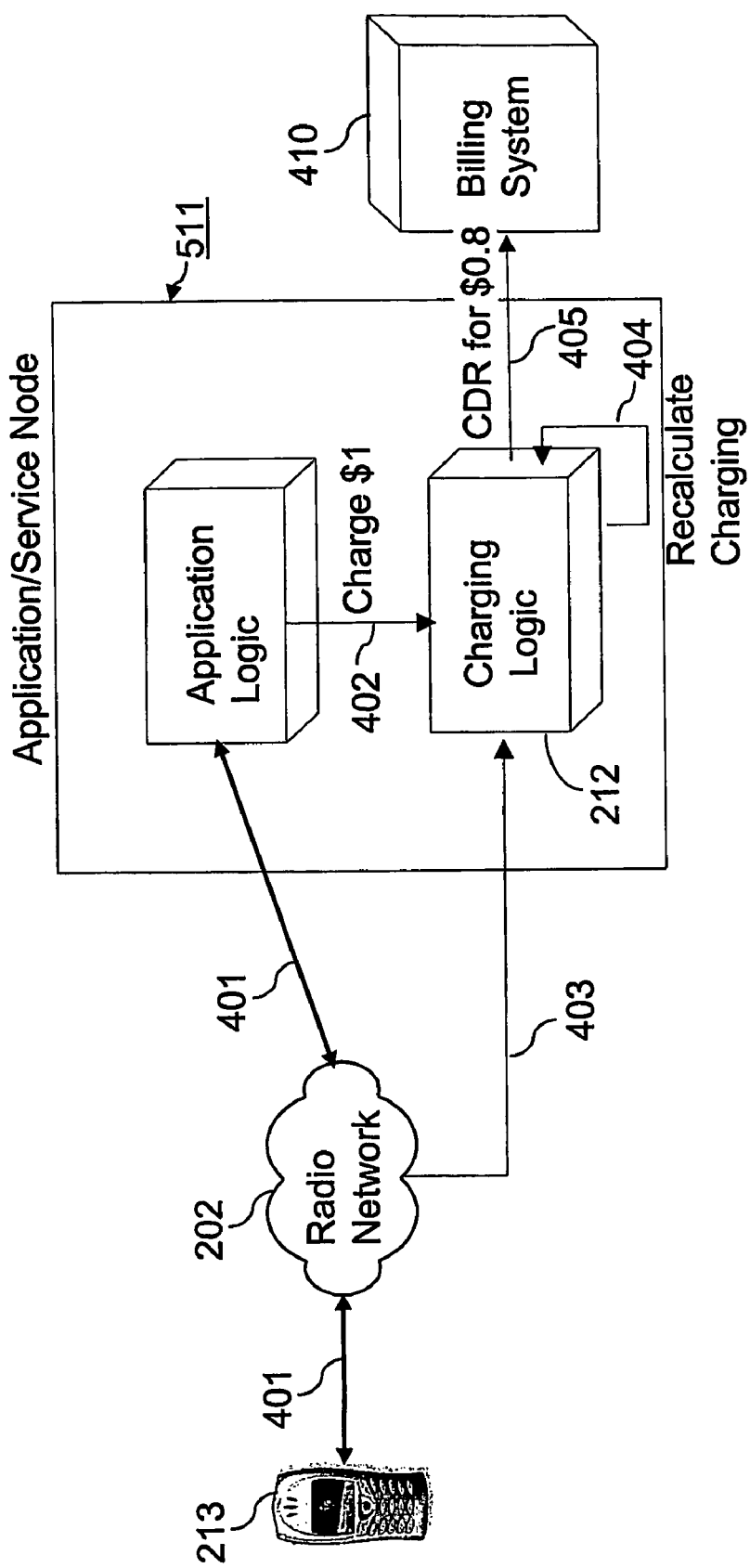
Figure 7:
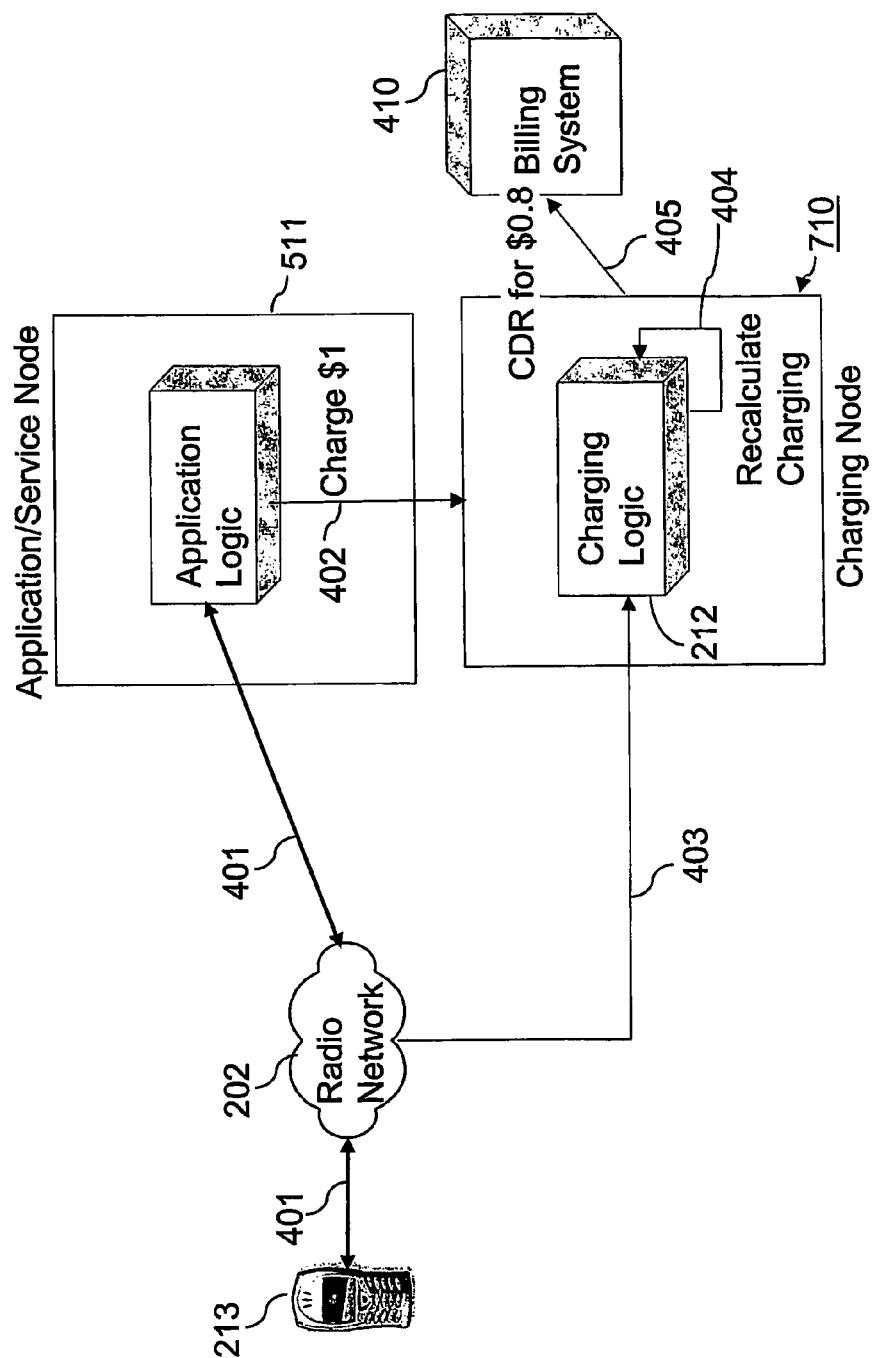

FIGS. 5, 6 and 7 illustrates that the charging logic 212 may be physically located in different locations of the communications system.

In FIG. 5 a Proxy Node 510 is used which includes a Mobile Proxy 210. The connection between the application logic and the UE 213 is established via the proxy 210 so that the application traffic passes through the mobile proxy as indicated in FIG. 5 by arrows 401 to an Application/Service Node 511 in which the application logic is located. In the embodiment in FIG. 5 the charging logic is co-located with the proxy 210 in the Proxy Node 510. The proxy 210 is here arranged to send the charging information to the charging logic 212 that tells the charging logic to charge $1 for usage of the MMS service (arrow 502) instead of the application logic as shown in FIG. 4.

FIG. 6 illustrates a scenario in which no proxy is used and the charging logic 212 is co-located with the application logic in an Application/Service Node 511.

In FIG. 7 the charging logic is located in Charging Node 710 which is physically separate from an Application/Service Node 511 comprising the application logic.

The main reason that decides one or another of the different locations of the charging logic that are illustrated in FIGS. 5-7 is where the operator would prefer to have the charging point situated, i.e. the place that decides what to charge and the amount to charge. If for instance a proxy is used then the radio network feedback can be sent to the Proxy Node 510 and the Application/Service Node does not need to implement the charging logic 212. This can be advantageous if the application is developed by a third party and/or resides outside the domain of the operator of the core network.

Figure 8:
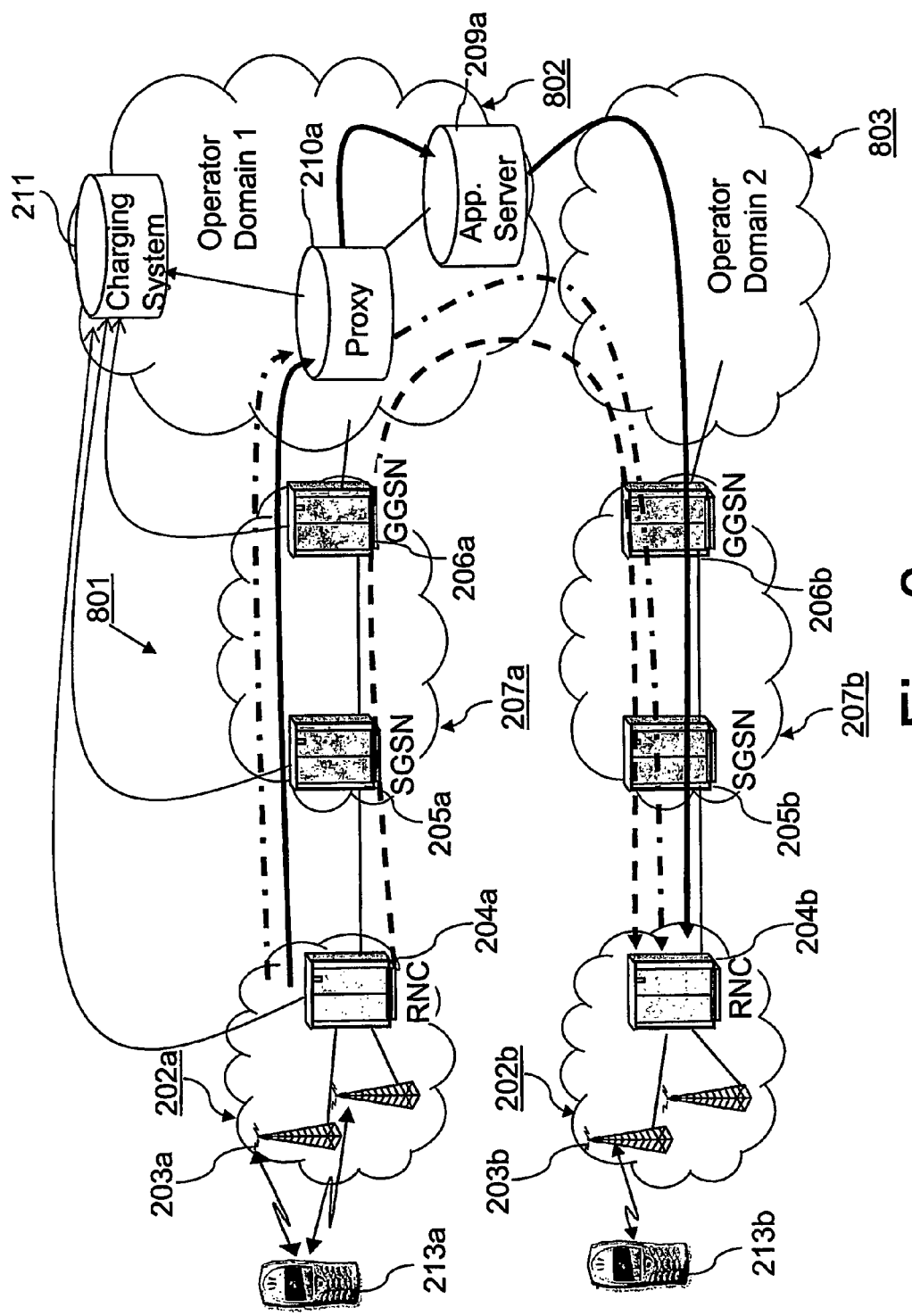
FIG. 8 is a schematic block diagram that illustrates an embodiment of the present invention in a UMTS system 201 in the case of P2P services.

Above aspects of the present invention has been explained for P2C services but the present invention is also applicable for person-to-person (P2P) services. FIG. 8 illustrates an example of charging for P2P services based on bandwidth indications from the Radio Access Network in accordance with the present invention. FIG. 8 illustrates a UMTS system 801 in which a P2P session may be set up between a first User Equipment (UE) 213a and a second User Equipment 213b.

The UMTS system 801 comprises two core networks (CN) 207a and 207b. The core network 207a comprises a Gateway GPRS Support Node (GGSN) 206a connected to a Serving GPRS Support Node (SGSN) 205a. The GGSN 206a may be connected to a plurality of SGSNs. The GGSN 206a is a gateway towards external networks such as a first operator's domain 802. The SGSN 205a is connected to at least one Radio Access Network 202a comprising a Radio Network Controller (RNC) 204a and at least one radio base station (RBS) 203a connected to the RNC 204a. Each RBS 203a provides wireless communication with the mobile terminal 213a.

Similarly, the core network 207b has similar components to the core network 207a. Thus, the core network 207b comprises a Gateway GPRS Support Node (GGSN) 206b connected to a Serving GPRS Support Node (SGSN) 205b. The GGSN 206b may be connected to a plurality of SGSNs. The GGSN 206b is a gateway towards external networks such as a second operator's domain 803. The SGSN 205b is connected to at least one Radio Access Network 202b comprising a Radio Network Controller (RNC) 204b and at least one radio base station (RBS) 203b connected to the RNC 204b. Each RBS 203 provides wireless communication with the mobile terminal 213b.

As is well known to the person skilled in the art a P2P service session may be set up between the UE 213a and the UE 213b via the Radio Access Network 202a, the core network 207a, the first operator's domain 802, the second operator's domain 803, the core network 207b and the Radio Access Network 202b. Analogously to the P2C scenario described above the RNC 204a may according to the present invention send information to the charging system 211 regarding the bandwidth that the P2P service session is allowed to use on the wireless link between the RBS 203a and the UE 213a. The charging system 211 may then consider this bandwidth information when determining the charging to be applied to the P2P session. The bandwidth information that is sent from the RNC 204a to the charging system 211 may be sent directly to the charging system 211 or may be relayed via other nodes in the communications system, such as SGSN 205a or GGSN 206a.

There are more or less delay sensitive P2P services. The more delay sensitive P2P services include e.g. video telephony and IP telephony. The less delay sensitive P2P services include e.g. shared MMS and chatting. For the more delay sensitive services it is preferable that traffic signals and any associated rate control messages do not traverse over unnecessarily many nodes in the service layer and it is therefore often preferable not to involve a proxy or application server. For the less delay sensitive services the operator may choose to involve a proxy 210a and/or application server 209a in the P2P service session and bandwidth information from the RNC 204a may then be relayed via the proxy 210a and/or the application server 209a.

In the example shown in FIG. 8 there are two wireless links involved in the P2P service session; one between the RBS 203a and the UE 213a and one between the RBS 203b and the UE 213b. For such a session both wireless links will have an impact on the end-users' perceived quality of service and it may therefore be of interest to adapt the charging of the session to the bandwidth of the session on both of the wireless links. For this purpose the RNC 204b may send information to a charging system in the second operator's domain 803 regarding the bandwidth that the session is allowed to use over the wireless link between the RBS 203b and the UE 204b. The charging systems in the first operator's domain 802 and the second operator's domain 803 may then exchange charging information to determine the charging of the session. It is common that operator's have Service Level Agreements with other operator's, which regulate how communications sessions involving several operators' domains are to be charged.

Applicant's co-pending patent applications: international patent application no. PCT/SE03/00022, filed Jan. 10, 2003, entitled "Arrangements and method for controlling transmission of data bits"; Swedish patent application no. SE 0301053-5, filed Apr. 7, 2003 (not published), entitled "Method and System in a Communications Network"; and the international patent application entitled "Method and System for Rate Control Service in a Network", filed approximately concurrently with this application and claiming priority from the previous mentioned Swedish patent application, are incorporated herein by reference. As explained in the above mentioned applications it is possible to let the radio resource managing unit, such as the RNC send information regarding the bandwidth of a wireless link that different sessions are allowed to use to e.g. the application server, the mobile proxy or another radio resource managing unit for rate control purposes. The application server, mobile proxy or radio resource managing unit may then adapt the rate of application traffic in accordance with the received bandwidth information. If such radio network feedback is implemented in a system for rate control purposes it is possible to synchronise this rate control radio network feedback with radio network feedback for charging purposes in accordance with the present invention. Thus if the RNC is already arranged to send bandwidth information for rate control purposes to e.g. the Mobile Proxy or Application Server, the Mobile Proxy or Application Server may be arranged to relay this bandwidth information to the charging system which may use the information to achieve fairer charging as explained above. Thereby the RNC is not required to send a special message or signal with bandwidth information for charging purposes. This type of synchronisation of radio network feedback for rate control purposes and charging purposes is advantageous since it can reduce the total amount of signalling traffic in the system.

It may be of interest to the charging logic to use the radio network feedback information from the radio resource managing unit according to the present invention for some sessions, but not for others. Thus the invention is preferably implemented such that the resource managing unit is notified whether or not the charging logic requires radio network feedback for a specific session. This notification may be accomplished during i) the configuration or ii) the session set-up.

The embodiments of the present invention described above are implementations in a UMTS system. However the present invention may be used in many different types of packet switched networks. For instance the invention may also be implemented in a 2.5G-system such as a GPRS system.

The radio resource managing unit, which according to the present invention provides radio network feedback that may be used by a charging logic to adapt the charging of a session, is the entity that controls the radio resources on the air interface. In a UMTS system this entity is the RNC and in a GSM system this unit is the BSC. The radio resource managing unit may have other names in other types of networks. It is the radio resource managing unit that has knowledge about the current physical limitations of the air interface, load information relating to different ongoing sessions competing for radio resources in a cell and other factors which may affect the bandwidth that a particular session may be allowed to use on the air interface. Based on its knowledge, the radio resource managing unit determines the bandwidth which it communicates as radio network feedback and which indicates the bandwidth that a given session is allowed to use over the air interface.

There are different implementation alternatives as to when the radio resource managing unit sends bandwidth information in the form of radio network feedback to the charging logic. Initial bandwidth information is preferably sent from the radio resource managing unit to the charging logic at session set-up and then further bandwidth information may be sent during the session according to some determined reporting scheme. This might imply that the radio resource managing unit sends radio network feedback to the charging logic each time it changes the bandwidth that the session is allowed to use over the air interface.

Another alternative is that the radio resource managing unit sends information about the current allowed bandwidth of the session at predetermined intervals, for instance every 10 seconds. A drawback with the latter alternative is that the charging logic may miss to adapt the charging to a change in the allowed bandwidth.

Yet another alternative is that the radio resource managing unit is arranged to send information on a new allowed bandwidth of a session to the charging logic when the new allowed bandwidth has been applied for a certain period of time. Thereby bandwidth changes that only last for a short period may be ignored for charging purposes. This may be advantageous if the characteristics of the radio interface changes very often and the radio recourse managing unit performs many bandwidth decisions for a session during a short period of time. In such a case reporting each bandwidth decision might result in an undesirably large amount of signalling which it would be impractical for the charging logic to take into account.

In other cases it is considered particularly important to adapt the charging of the session when quick bandwidth changes occur since quick bandwidth changes are particularly annoying for some services. In those cases the alternative in which the radio resource managing unit sends radio network feedback to the charging logic each time it changes the bandwidth is preferred. According to an embodiment of the present invention the radio resource managing unit is arranged to apply different reporting frequencies of bandwidth information to the charging logic for different sessions depending on the type of service of the sessions.

As mentioned above it could happen during a session that the end-user is temporarily "out-of-connection" with the Application server e.g., when the user moves indoor where the coverage is poor or when a cell re-selection occurs. If an interruption happens this might trigger the end-user to terminate the session. There may thus be situations in which the bandwidth of the session over the air interface is temporarily zero but the session is still alive and situations in which the session has been terminated so that the bandwidth of the session is zero and will continue to be zero. These different situations may be reported differently to the charging logic by means of using different codes so that the charging logic becomes aware of when a session has terminated and when a session is still alive but the bandwidth of the session is temporarily set to zero.

When implementing the present invention in existing communication systems existing software and/or hardware will have to be modified as will be understood by the person skilled in the art. In most cases the modifications will mainly be software modifications. The radio resource managing unit must be adapted so that it can communicate the radio network feedback according to the present invention to charging logic possibly via another unit, such as the SGSN, the proxy or the application server. For this purpose the radio resource managing unit may have to be informed of e.g. IP-address and port number of the proxy or the application server. The radio resource managing unit may be provided with such address and port number information upon configuration, during session set-up or by means of sniffing (which involves intercepting messages in the communications system which are known to include the desired information and extracting the information from these messages). In the embodiment illustrated in FIG. 2, one way to convey the bandwidth information to the charging logic is to use the established GTP-U tunnel between the RNC and the GGSN. This, however, requires extra functionalities in the GGSN for relaying the bandwidth information to the charging logic. Another approach may be to directly inform the RNC about the IP address of the charging logic upon i) configuration or ii) session set-up. By doing so, the RNC updates the charging logic about the allowed bandwidth of a session without any interrogation from an intermediate node.

Furthermore, the charging logic, which according to the invention adapts the charging of the session based on the radio network feedback, must be adapted to be able to receive and interpret the radio network feedback and to be able to adapt the charging of the session based on the received bandwidth information. It will be apparent to the person skilled in the art how the present invention may be implemented using known hardware and software means. The radio network feedback mechanism according to the present invention may be implemented using a separate protocol created for this purpose.

Figure 9:
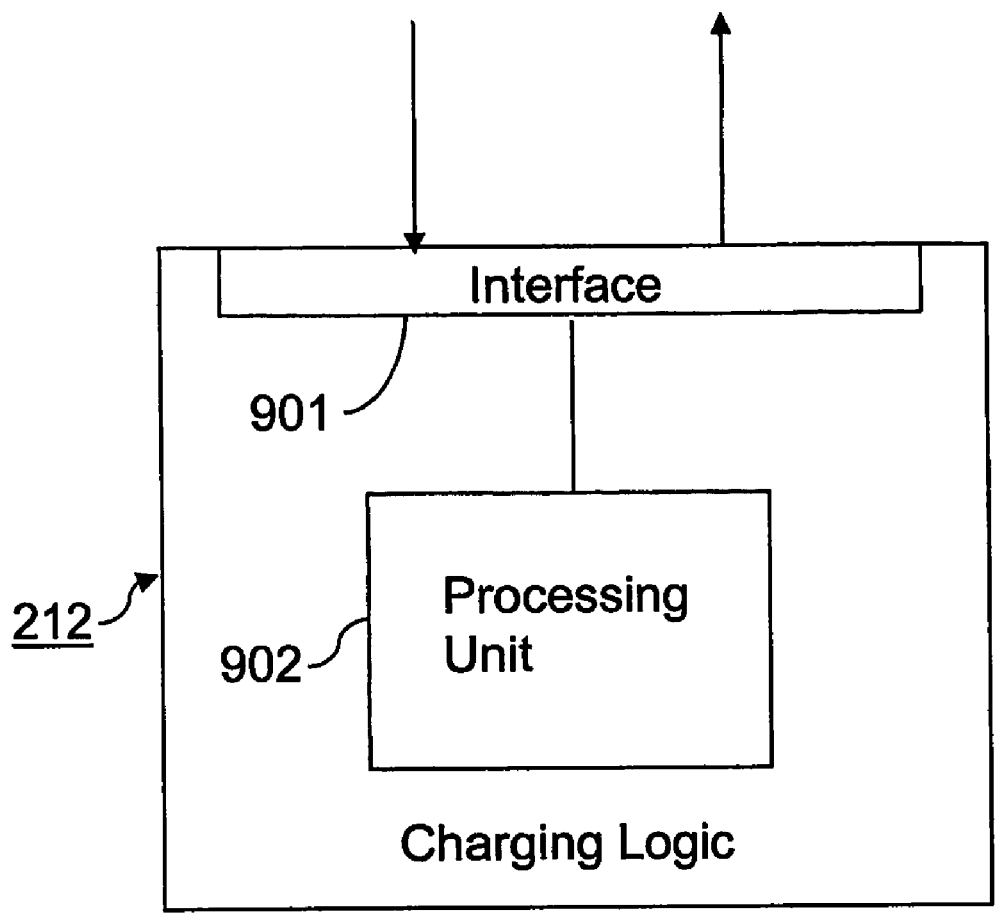
FIG. 9 is a schematic block diagram illustrating an embodiment of a charging logic 212 according to the present invention.

FIG. 9 is a schematic block diagram illustrating an embodiment of a charging logic 212 according to the present invention. The charging logic 212 includes a communications interface 901 for receiving charging information from different parts of the communications system. According to the present invention the communications interface must be adapted to receive bandwidth information from the radio resource managing unit of the communications system. The charging logic 212 of FIG. 9 is illustrated with a single communications interface, but it is also possible that the charging logic includes several communications interfaces dedicated to receive charging information from different units in the communications system. The charging logic may thus include a separate communications interface arranged to receive the bandwidth information from the radio resource managing unit. The charging logic 212 comprises furthermore a processing unit 902 which is arranged to process the received charging information regarding different sessions and to determine the charging related to the different sessions based on the received information. According to the present invention the processing unit must be adapted to process the bandwidth information received from the radio resource managing unit and adapt the charging of sessions in accordance with the bandwidth information. The operator will determine in which way the processing unit will take the bandwidth information into account for different sessions. The operator may therefore program the processing unit to apply algorithms, which use the bandwidth information as an input parameter and which based on this input parameter, and possibly also based on other input parameters, calculates the charging to be applied to different sessions.

In the drawings and specification, there have been disclosed typical preferred embodiments of the invention and, although specific terms are employed, they are used in a generic and descriptive sense only and not for purposes of limitation, the scope of the invention being set forth in the following claims.

The invention claimed is:

1. A method for determining a charging rate related to a data bit transfer session for a mobile client communicating with a radio resource managing unit comprising the steps of:

dynamically determining a bandwidth on the wireless communication link available to and allowed to be used by the bit transfer session for said mobile client;

a charging logic receiving information from the radio resource managing unit about the bandwidth on the wireless communication link that the bit transfer session is available to use; and said charging logic applying a particular charging rate for said mobile client based on said received bandwidth information for said data bit transfer session wherein the charging logic adapting the charging rate related to the bit transfer session such that the session is charged according to a first charging rate associated with a first charging class when the bandwidth on the wireless link available to the bit transfer session is within a first predetermined interval and according to a second charging rate associated with a second charging class when the bandwidth on the wireless link available to the bit transfer session is within a second predetermined interval.

2. The method for determining said charging rate according to claim 1 further comprising The charging logic receiving said information from the radio resource managing unit each time the bandwidth on the wireless link available to the bit transfer session has changed.

3. The method for determining said charging rate according to claim 1 further comprising the charging logic receiving said information from the radio resource managing unit at predetermined intervals.

4. The method for .determining said charging rate according to claim 1 further comprising the charging logic receiving said information from the radio resource managing unit each time the bandwidth on the wireless link available to the bit transfer session has changed and the bandwidth change has been applied to the session for a predetermined period of time.

5. The method for determining said charging rate according to claim 1 further comprising the charging logic receiving said information from the radio resource managing unit at intervals which depend on a service type of the bit transfer session.

6. The method for determining said charging rate according to claim 1 further comprising the charging logic receiving said information from the radio resource managing unit via an application server which relays said information from the radio resource managing unit to the charging logic.

7. The method for determining said charging rate according to claim 1 further comprising the charging logic receiving said information from the radio resource managing unit via a mobile proxy which relays said information from the radio resource managing unit to the charging logic.

8. The method for determining said charging rate according to claim 1 further comprising the charging logic determining that the charging rate related to the bit transfer session should be zero when the bandwidth on the wireless link available to the bit transfer session is below a predetermined threshold level.

9. The method for determining said charging rate according to claim 1 further comprising the charging logic adapting the charging rate related to the bit transfer session based on said received information from the radio resource managing unit such that the impact of said received information from the radio resource managing unit on the charging rate of the bit transfer session depends on a service type of the bit transfer session.

10. A telecommunications charging system associated with a mobile client communicating with a radio resource managing unit over a wireless communication link within a telecommunication network system, comprising:

means for dynamically determining a bandwidth available for and allowed to be used by a particular data bit transfer session established between said mobile client and said radio resource managing unit over said wireless communication link;

reception means for receiving information from the radio resource managing unit about the bandwidth on the wireless link available for the bit transfer session; and charging server for applying a particular charging rate for said mobile client based on said received bandwidth information for the bit transfer session wherein the charging server is arranged to adapt the charging rate related to the bit transfer session such that the session is charged according to a first charging rate associated with a first charging class when the bandwidth on the wireless link available to the bit transfer session is within a first predetermined interval and according to a second charging rate associated with a second charging class when the bandwidth on the wireless link available to the bit transfer session is within a second predetermined interval.

11. The telecommunication charging system according to claim 10, wherein said reception means is arranged to receive said information from the radio resource managing unit each time the bandwidth on the wireless link that the bit transfer session is available to use has changed.

12. The telecommunication charging system according to claim 10, wherein said reception means is arranged to receive said information from the radio resource managing unit at predetermined intervals.

13. The telecommunication charging system according to claim 10, wherein said reception means is arranged to receive said information from the radio resource managing unit each time the bandwidth on the wireless link available to the bit transfer session has changed and the bandwidth change has been applied to the session for a predetermined period of time.

14. The telecommunication charging system according to claim 10, wherein said reception means is arranged to receive said information from the radio resource managing unit at intervals which depend on the service type of the bit transfer session.

15. The telecommunication charging system according to claim 10 wherein said reception means is arranged to receive said information from the radio resource managing unit via an application server which relays said information from the radio resource managing unit to the charging logic.

16. The telecommunication charging system according to claim 10 wherein said reception means is arranged to receive said information from the radio resource managing unit via a mobile proxy which relays said information from the radio resource managing unit to the charging logic.

17. The telecommunication charging system according to claim 10 wherein the charging server is arranged to determine that the charging rate related to the bit transfer session should be zero when the bandwidth on the wireless link available to the bit transfer session is below a predetermined threshold level.

18. The telecommunication charging system according to claim 10 is incorporated in a proxy node which further incorporates a mobile proxy.

19. The telecommunication charging system according to claim 10 is incorporated in an application/service node which further incorporates an application logic.

20. The telecommunication charging system according to claim 10 is incorporated in a charging node, which is a node dedicated to charging functionality.

21. The telecommunication charging system according to claim 10 in that the charging server is arranged to adapt the charging rate related to the bit transfer session based on said received information from the radio resource managing unit such that the impact of said received information from the radio resource managing unit on the charging of the bit transfer session depends on a service type of the bit transfer session.

* * * * *

UNITED STATES PATENT AND TRADEMARK OFFICE
CERTIFICATE OF CORRECTION

| | | |
|---|---|---|
| PATENT NO. | : 7,873,346 B2 | Page 1 of 1 |
| APPLICATION NO. | : 10/595877 | |
| DATED | : January 18, 2011 | |
| INVENTOR(S) | : Petersson et al. | |

It is certified that error appears in the above-identified patent and that said Letters Patent is hereby corrected as shown below:

In Column 5, Line 47, delete "is level." and insert -- level. --, therefor.

In Column 13, Line 25, in Claim 2, delete "The" and insert -- the --, therefor.

Signed and Sealed this

Thirty-first Day of May, 2011

David J. Kappos
*Director of the United States Patent and Trademark Office*